Feb. 24, 1925. 1,527,274
F. S. ROYER
AUTOMOBILE LAMP
Filed Dec. 26, 1922
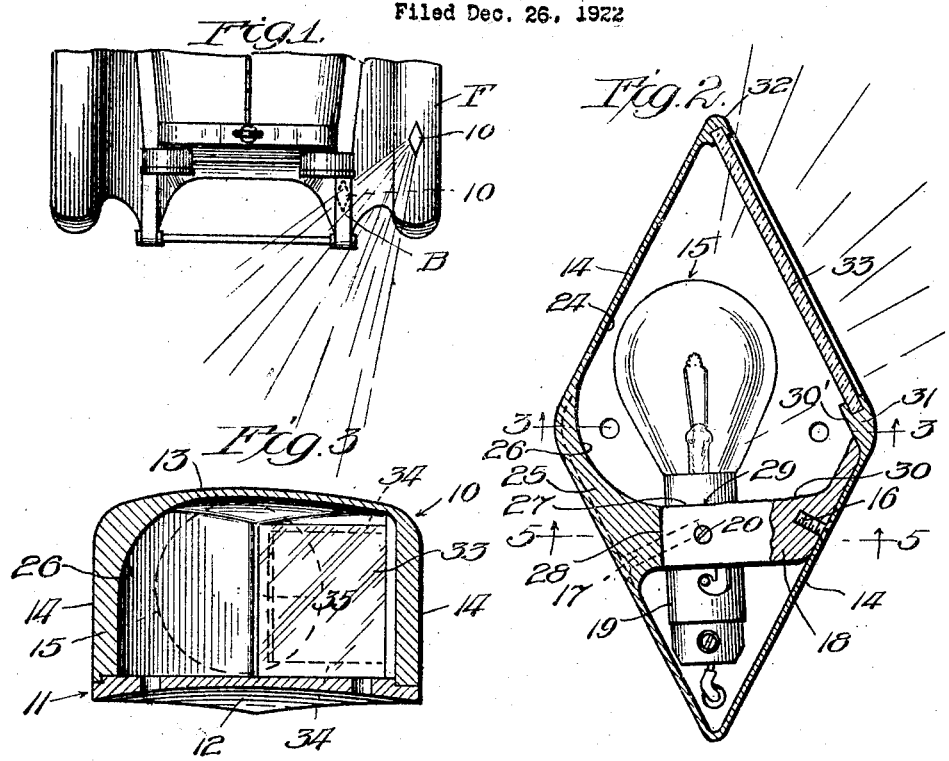
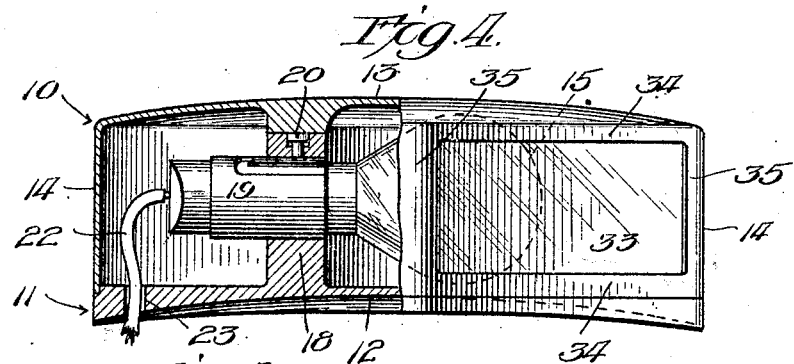
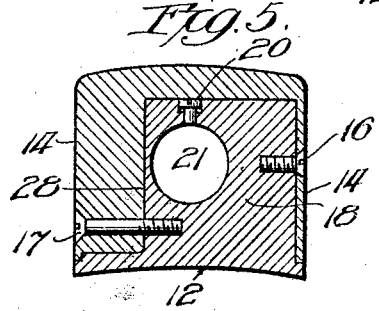
Inventor:
Frank S. Royer
by William K. Hall
Atty Patented Feb. 24, 1925.

1,527,274

UNITED STATES PATENT OFFICE.

FRANK S. ROYER, OF CHICAGO, ILLINOIS.

AUTOMOBILE LAMP.

Application filed December 26, 1922. Serial No. 608,854.

*To all whom it may concern:*

Be it known that I, FRANK S. ROYER, a citizen of the United States, and a resident of Chicago, in the county of Cook and State of Illinois, have invented certain new and useful Improvements in Automobile Lamps; and I do hereby declare that the following is a full, clear, and exact description thereof, reference being had to the accompanying drawings, and to the characters of reference marked thereon, which form a part of this specification.

This invention relates to improvements in automobile road lamps, and refers more particularly to a novel lamp designed to be so stationed on the automobile as to furnish a guiding light for the driver of said automobile in front and at the side of his machine towards the turn-out direction thereof, and at the same time avoid light rays being thrown either directly or by reflection into the eyes of the driver of an oncoming car. Heretofore in the use of road lamps of the universal spot light type or fixed type it has not been possible, so far as I am aware, to provide a light of such volume as is desired as a road light when passing an oncoming machine without the inconvenience of throwing a glare of either direct or reflected rays into the eyes of oncoming drivers.

Furthermore, in the use of spot lamps supported on the windshield posts of an automobile, if the lamp be turned to direct its rays obliquely across the road with an attempt to avoid throwing its full glare into the eyes of an oncoming driver and also to light the side of the roadway towards which the car will turn when passing an oncoming car, a volume of light is thrown across the engine hood with the disadvantage of partially obscuring the vision of the driver of the car carrying said lamp and obstructing a satisfactory view of the ditch side of the roadway towards which the latter car will be turned. At the same time, in most of the so-called adjustable spot lamps of this character, so far as I am aware, it is not practicable to thus illuminate the roadway in front of the car and at the side of the roadway for safe driving without directing portions of the lamp rays forwardly so as to interfere with the driving sight of the driver of the oncoming car.

It is the purpose of the present invention to provide a fixed or stationary road lamp structure that is adapted to be supported on a part of the car which, when the lamp is lighted, throws the rays thereof diagonally across the roadway in front of the car to give a good driving light on the roadway a satisfactory distance ahead of the car and also to illuminate the side of the roadway towards which the driver of the car carrying said lamp structure will turn when passing an oncoming car. Said lamp embodying my improvements will be connected to a source of current supply through a circuit that is operated by a switch which can be operated to close the lamp circuit when the head lamps or other lamps on the car are extinguished or dimmed at the time of passing an oncoming car, so that the illumination from my improved lamp may be relied upon to furnish ample light a sufficient distance on the road in front of said car and at the sides thereof to enable the driver to proceed safely when passing an oncoming car, and without directing the rays from the stationary lamp into the eyes of the driver of the oncoming car. For this purpose a single stationary lamp may be supported on the fender of the car on that side thereof remote from the side of the road towards which the car will turn in passing another vehicle, and at such distance from the front of the radiator as to avoid obstruction of the illumination from the lamp. The lamp may be otherwise placed as, for instance, on the chassis frame of the car at a point in advance of the radiator with the same results with respect to the throw of the light rays therefrom on the roadway.

I have shown in the drawings one practical form of lamp structure embodying my invention, and will describe the invention with respect to the details thereof, but it will be understood that the details of the lamp may be varied within the scope of the appended claims and that it is the intent to claim all of inherent novelty disclosed in the drawings and the specification.

As shown in said drawings:

Figure 1 is a fragmental view of the front part of an automobile showing my improved road lamp adapted thereto.

Figure 2 is a horizontal section of the lamp structure with the light outlet of the lamp reversed from the position shown in Figure 1.

Figure 3 is a section on the line 3—3 of Figure 2 with the position of the lamp bulb indicated in dotted lines.

Figure 4 is an inner side view of the lamp structure with the rear portion thereof broken away to disclose interior details.

Figure 5 is a cross section on the line 5—5 of Figure 2.

As shown in the drawings, the lamp casing is of general diamond or lozenge shape. This particular configuration need not necessarily be followed at the rear of the casing but is a desirable configuration for the front thereof. The casing comprises in general terms an upper member 10 and a lower member 11. The lower member is a base member and is of general flat form except for the curvature or camber given to its under side at 12 to fit the curvature of a fender F, a spring bracket B, or the like, when supported on said parts. The upper member comprises a top wall 13 and depending rims 14, 14 which meet at the pointed end of the base and the casing and are spread apart between their ends to afford room for the lamp bulb 15. The said casing may be made of any suitable light material, such for instance as aluminum, and the said upper and lower members are attached together by means of screws 16, 17, which extend laterally through the rims and into a cross piece 18 which is formed as an integral part of the base member and extends upwardly therefrom to constitute a support for the lamp socket receptacle 19, which latter may be secured to such cross piece by a set screw 20. One side of the rim 14 is thickened, as indicated in Figure 5, and the cross piece or partition 18 is made of a width to extend across the plane of the longitudinal center of the casing so that the opening 21 in which the receptacle 19 fits can be wholly made in said cross piece or partition. The terminal of said receptacle 19 is connected to the circuit wire or wires 22 and the base 12 is provided within the rear end of the enclosing casing with an aperture 23 through which said conductor extends. With this construction it is convenient to extend the circuit cord directly through the fender, if the lamp structure is to be supported on a fender, so as to contribute to the neatness of the installation.

One side of the rim 14 in advance of the center of the casing is made thin, as shown in Figure 2, to constitute an interior diagonal reflecting surface 24. The rear part of the latter rim is thickened at 25, and its inner surface is fashioned to constitute a curved reflecting surface 26, said curved reflecting surface merging into the forward face 27 of the cross piece or partition 18,—said thickened rim portions and the cross piece or partition being joined along the vertical line 28. The said cross piece or partition is also finished to produce a reflecting surface to the point indicated by 29 which lies in the center of the lamp. The said cross piece on the side of said center line 29, remote from the reflecting surface 26, is finished to produce a non-reflecting or light absorbing surface 30, or it may be an unfinished surface.

The side rim of the upper member is thickened at its central and front portions 31, 32, respectively. The inner face of the thickened portion 31 is finished to produce a non-reflecting surface $30^1$ that merges in the surface 30. The said thickened portions 31, 32, as well as the bottom side of the top piece, are grooved to receive the end and top edges of a lens 33 which lens constitutes the major part of the inner oblique side of the frame or casing and outwardly through which the light rays, both direct and reflected, are emitted. The metal parts of the said inner front oblique wall of the casing are thus fashioned to produce on top and bottom and the front and rear frame members 34, 34 and 35, 35, respectively, as shown in Figure 4, a window in which the lens 33 is permanently set. The lens is adapted to be inserted into said grooved frame through the open lower side thereof and is limited by contact of its upper edge with the upper portion of the frame member 34, and held in place by the base member 12 when the latter is assembled in the frame and fastened in place.

From an inspection of Figure 2 it will be noted that the theoretical point source of light is located to the left hand side of a plane $x$ passed longitudinally through the casing and intersecting the acute angles of the diamond or lozenge shaped frame. It will also be observed that the non-reflecting surfaces 30, 30' are on the side of said plane remote from the point source of light. Therefore, it will be obvious that the rays emitted from the lamp as direct rays, and from the reflecting surfaces 24, 26, 27 as indirect rays, will be thrown as a diagonally forwardly and laterally directed beam, as indicated in Figure 1 and 2. It will also be obvious that the light from the theoretical point source is obstructed from passing directly forwardly from the lamp, this being due to the fact that the point source of light lies on that side of said plane $x$ adjacent to the reflector 24. It will also be observed that the non-reflecting surfaces 30, $30^1$ will prevent passage of reflected rays directly forwardly. On the other hand, the direct light rays from the lamp are free to pass obliquely forwardly through the lens and the reflecting surfaces 24, 26 and 27 are so related to each other and to the theoretical point source of light that the reflected lamp rays will be also directed obliquely forwardly to constitute a portion of the light shaft emitted through the lens 33 from the lamp casing.

It will be observed that the height of the lens is such that the light shaft will strike the roadway in advance but at one side of the line of travel of the car and also the side of he roadway, and the casing is of such size, while compact, that a lamp of ample candle power may be used to produce a volume of light that will efficiently illuminate the roadway in front of the car and at the side thereof towards which the car will turn in passing, that the driver of said car will have a safe light and his lamp will not project either direct or reflected rays into the eyes of the driver of an oncoming car.

If the lamp structure be supported on the bracket B, the light shaft will be lower with respect to the car but can be fixed to said bracket in a way to throw the light shaft on the desired portion of the roadway.

A lamp structure embodying my invention may also be applied to one or both of the rear fenders of a car so as to produce a backing light or a light which will illuminate the roadway in rear and at the side of the car when backing or reversing the car. In such event, the diagonal lens side of the casing will be directed laterally downwardly.

While I have shown the reflecting surfaces made on the interior wall of the casing and lamp support or partition, it will be understood that other forms of reflecting surfaces may be employed within the spirit and scope of the claims hereto appended.

It will be observed that the said reflecting surface at its back is a part-spherical surface face to properly direct the light rays obliquely forwardly and downwardly from the lamp within said part-spherical surface and that the part of the reflecting surface beyond said spherical surface is straight in general outline and can be transversely shaped or angularly positioned to throw the reflected light rays towards the roadway. It will also be noted that the central fore and aft plane of the lamp is slightly oblique outwardly, or away from the lens, relatively to the similar plane of the casing.

I claim as my invention:—

1. A vehicle road lamp adapted to be fixedly attached to a stationary part and at one side, and below the windshield of a vehicle body, embracing a lamp casing having a chamber bounded on its lateral side adjacent to the vehicle body by a lens oblique to the fore and aft central vertical plane of the casing, said casing having interior reflecting and non-reflecting surfaces to control the throw of all of the direct and reflected light rays obliquely forwardly relatively to said plane and to avoid straight ahead throw of any of said rays.

2. A vehicle road lamp adapted to be fixed to a stationary part and at one side of a vehicle body, embracing a casing having a chamber bounded on its side laterally adjacent to the vehicle body by an oblique lens, the side of the casing remote from said lens and the rear of the casing having reflecting and non-reflecting surfaces respectively to control the throw of all the direct and reflected light rays of a single lamp wholly through said lens.

3. A vehicle road lamp adapted to be fixed to a stationary part and at one side of a vehicle body, embracing a casing having a chamber bounded on its side laterally adjacent to the vehicle body by a lens oblique to the line of travel of the vehicle, said casing being made of upper and lower parts and provided with a member to receive and hold a lamp receptacle, and provided in front of said member with reflecting and non-reflecting surfaces, said reflecting surfaces being located wholly on that side of a vertical fore and aft plane passed through the lamp receptacle remote from the vehicle body.

4. A road lamp adapted to be fixed to a stationary part and at one side of a vehicle body, embracing a lamp casing having a pointed front end with the side walls forming an acute angle to the line of travel of the vehicle, and with its inner wall formed with a window closed by a lens, a lamp supported in the casing, with its point source of light on the side of a vertical central plane passed through said acute angle remote from said lens, and interior reflecting and non-reflecting surfaces on the casing walls remote from said lens and terminating in the vertical plane of the point source of light.

5. A road lamp for the purpose set forth comprising an elongated casing, having intersecting forward side walls, one forward side wall including a lens and the inner side of the other forward wall from the intersection of said walls back to the central longitudinal plane thereof comprising a reflecting surface, the inner face of the casing between said plane and lens comprising a non-reflecting surface.

6. A road lamp for the purpose set forth comprising an elongated casing having intersecting forward side walls, one forward side wall of which includes a lens and the inner side of the other forward wall backwardly from the intersection of said walls comprising a reflecting surface, the inner face of the casing between the vertical plane of said intersection and lens comprising a non-reflecting surface, said casing being provided interiorly with a socket holder which extends into the rear of the casing, and provided at the base of said casing with an opening for the passage of a lamp cord.

7. A lamp for the purpose set forth comprising a casing having a forwardly pointed end with the side walls meeting at an acute angle, one of said side walls embodying a lens and there being on the inner side of the other side wall a front reflector to generally conform to the latter side wall and a rear non-reflecting surface.

8. A lamp for the purpose set forth comprising a casing having a forwardly pointed end with the side walls meeting at an acute angle, one of said side walls embodying a lens and there being on the inner side of the other side wall a reflector having a generally straight portion opposite to said lens and a part-spherical portion at the back end to enclose a lamp supported in said chamber.

In witness whereof I claim the foregoing as my invention, I hereunto append my signature this 22nd day of December, 1922.

FRANK S. ROYER.